(12) United States Patent
McKinley

(10) Patent No.: US 6,498,940 B1
(45) Date of Patent: Dec. 24, 2002

(54) SENDING DIALED NUMBER

(75) Inventor: Stephen Joseph Peter McKinley, Surrey (GB)

(73) Assignee: Telefonaktiebolaget L M Ericsson, Stockholm (SE)

(*) Notice: Subject to any disclaimer, the term of this patent is extended or adjusted under 35 U.S.C. 154(b) by 0 days.

(21) Appl. No.: 09/433,936

(22) Filed: Nov. 4, 1999

(30) Foreign Application Priority Data

Nov. 5, 1998 (GB) .............................................. 9824300

(51) Int. Cl.$^7$ ................................................. H04Q 7/20
(52) U.S. Cl. ........................ 455/564; 455/460; 455/401; 379/355
(58) Field of Search ................................ 455/401, 412, 455/404, 521, 422, 414, 564, 565, 403, 418, 445, 426, 554, 555, 460; 379/355, 356, 37–51, 360, 361, 352, 354, 357, 88.02, 111–114, 125–126, 220–221, 209–210

(56) References Cited

U.S. PATENT DOCUMENTS

| | | | |
|---|---|---|---|
| 4,658,096 A | | 4/1987 | West, Jr. et al. ............... 379/59 |
| 4,959,851 A | * | 9/1990 | Tobolski et al. ............. 455/411 |
| 5,339,357 A | | 8/1994 | Sawamura et al. .......... 379/355 |
| 5,535,260 A | * | 7/1996 | Zicker et al. ................ 455/419 |
| 6,032,034 A | * | 2/2000 | Rabina et al. ............... 455/401 |
| 6,035,220 A | * | 3/2000 | Claudio et al. ........ 379/355.02 |
| 6,137,877 A | * | 10/2000 | Robin et al. ............ 379/114.24 |
| 6,195,427 B1 | * | 2/2001 | Hansen et al. .............. 379/352 |
| 6,240,277 B1 | * | 5/2001 | Bright ......................... 379/434 |
| 6,256,488 B1 | * | 7/2001 | Lee et al. .................... 379/360 |
| 6,259,905 B1 | * | 7/2001 | Berkowitz et al. .......... 455/401 |
| 6,332,073 B1 | * | 12/2001 | Nilsson et al. .............. 455/404 |

FOREIGN PATENT DOCUMENTS

| | | |
|---|---|---|
| GB | 2 023 966 A | 1/1980 |
| GB | 2 311 696 A | 10/1997 |
| GB | 2 326 800 A | 12/1998 |
| GB | 2 329 095 A | 3/1999 |
| WO | WO90/14729 | 11/1990 |
| WO | WO96/32824 | 10/1996 |
| WO | WO97/50262 | 12/1997 |
| WO | WO98/01988 | 1/1998 |

* cited by examiner

*Primary Examiner*—Thanh Cong Le
*Assistant Examiner*—Pablo N. Tran

(57) ABSTRACT

A telephone dialling apparatus appends an end-of-dialling signal, for example a "SEND" signal, to a dialled telephone number by determining from first and second dialled digits how many digits constitute a telephone number to be subsequently dialled. After the dialling apparatus has determined that the correct number of digits have been dialled, it automatically appends the end-of-dialling signal to the telephone number. The dialling apparatus may be used in a system in which a fixed line telephone is connected to a mobile network via a fixed access unit.

9 Claims, 3 Drawing Sheets

SENDING DIALED NUMBER

This application claims priority under 35 U.S.C. §§119 and/or 365 to 9824300.9 filed in United Kingdom on Nov. 5, 1998; the entire content of which is hereby incorporated by reference.

TECHNICAL FIELD OF THE INVENTION

The invention relates to the sending of a dialled telephone number, and in particular, to eliminating the need to press a "SEND" button after dialling a telephone number intended for a mobile network, for example when dialling on a fixed line telephone connected to a Fixed Access Unit.

BACKGROUND

A Fixed Access Unit (FAU) is an unit that enables conventional fixed line subscriber equipment, for example conventional wired telephones and facsimile machines, to be connected to a mobile telephone network. The FAU acts as the interface between the mobile environment and the fixed environment.

The role of the FAU is to convert mobile network signals and protocols into signals and protocols recognised by the fixed network, and vice versa.

When making a telephone call from a mobile telephone, a caller has to press a "SEND" key after the dialled digits have been entered. The purpose of the "SEND" signal is to allow the dialling operation to be carried out before connecting to a radio channel, thereby reducing the time which the caller is connected to the radio channel. This is turn reduces both the cost of a call and the traffic on the mobile network.

This requirement of having to press a "SEND" button poses a problem when dialling from a fixed line telephone which is connected to a FAU.

Some prior art systems overcome this problem by requiring the user to press some other key on the conventional telephone, for example the "*" or "#" keys, to send the dialled telephone number. This has the disadvantage that it does not allow the user to make any USSD (Unstructured Supplementary Services Data) or public MMI (Man Machine Interface) calls, whereby the "*" and/or "#" keys have other meanings.

FIG. 1 shows the dialling procedure according to another prior art system. After receiving each dialled digit in step S1, a counter is incremented in step S2. The system then checks in step S3 whether the counter has reached a preset value corresponding to the expected number of digits making up the telephone number. If not, it returns to step S1 and waits for the next dialled digit to be entered. If the counter has reached the preset value in step S3, it assumes that the complete telephone number has been entered, and appends the "SEND" signal to the dialled digits in step S4. In other words, the system automatically appends a "SEND" signal after a predetermined number of digits have been dialled.

This type of system suffers from the disadvantage that it relies on a standard number of digits making up a telephone number. However, this is not always possible, for example, when making a combination of local, national and international calls.

FIG. 2 shows the dialling procedure according to another prior art system. After the first dialled digit is received in step S10, a timer is started in step S11. In step S12, the system determines whether another digit has been entered before the timer has timed-out. If a digit has been entered within this time, the timer is reset and restarted in step S11, and the system again determines whether another digit has been entered before the timer has timed-out. If no digits are entered during this time, the system assumes that the caller has completed the dialling process, and appends the "SEND" signal in step S13 to the dialled digits that have already been received. In other words, if a predetermined period of time has lapsed without a key being pressed, it is assumed that the caller has finished dialling. This type of system suffers from the disadvantage of increasing the call set-up time.

The aim of the present invention is to overcome the disadvantages mentioned above, by having a dialling apparatus that does not require the pressing of a "SEND" key, does not rely on a predetermined number of digits in the telephone number, and does not delay the sending of the dialled telephone number.

SUMMARY OF THE INVENTION

According to the invention, there is provided a dialling apparatus comprising;

means for determining from first and second dialled digits how many digits constitute a telephone number to be subsequently dialled;

means for determining when the digits constituting the telephone number have been dialled; and, means for automatically appending an end-of-dialling signal to the end of the telephone number.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF A PREFERRED EMBODIMENT OF THE PRESENT INVENTION

Figure 1:
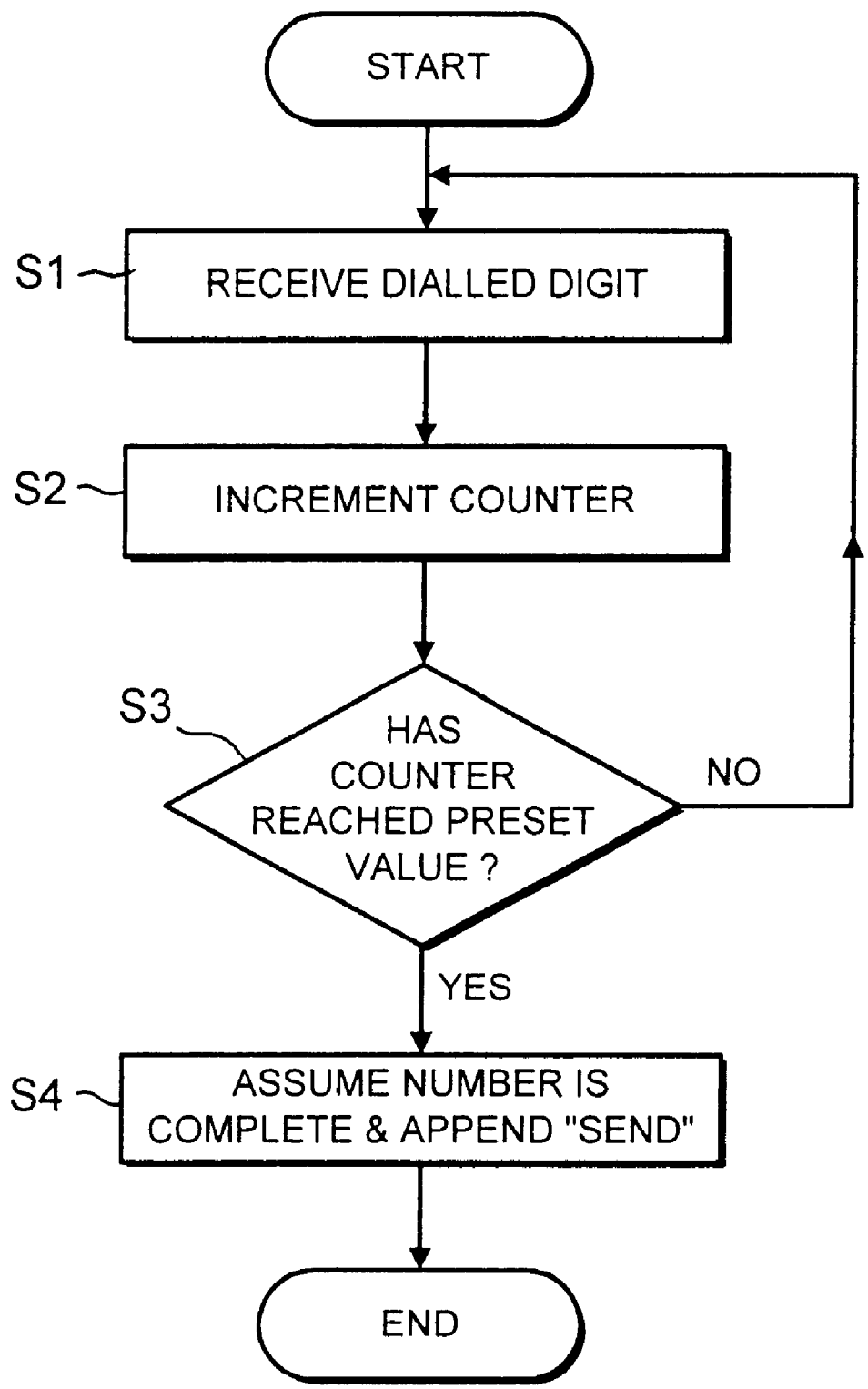
FIG. 1 shows a dialling procedure according to the prior art.
Figure 2:
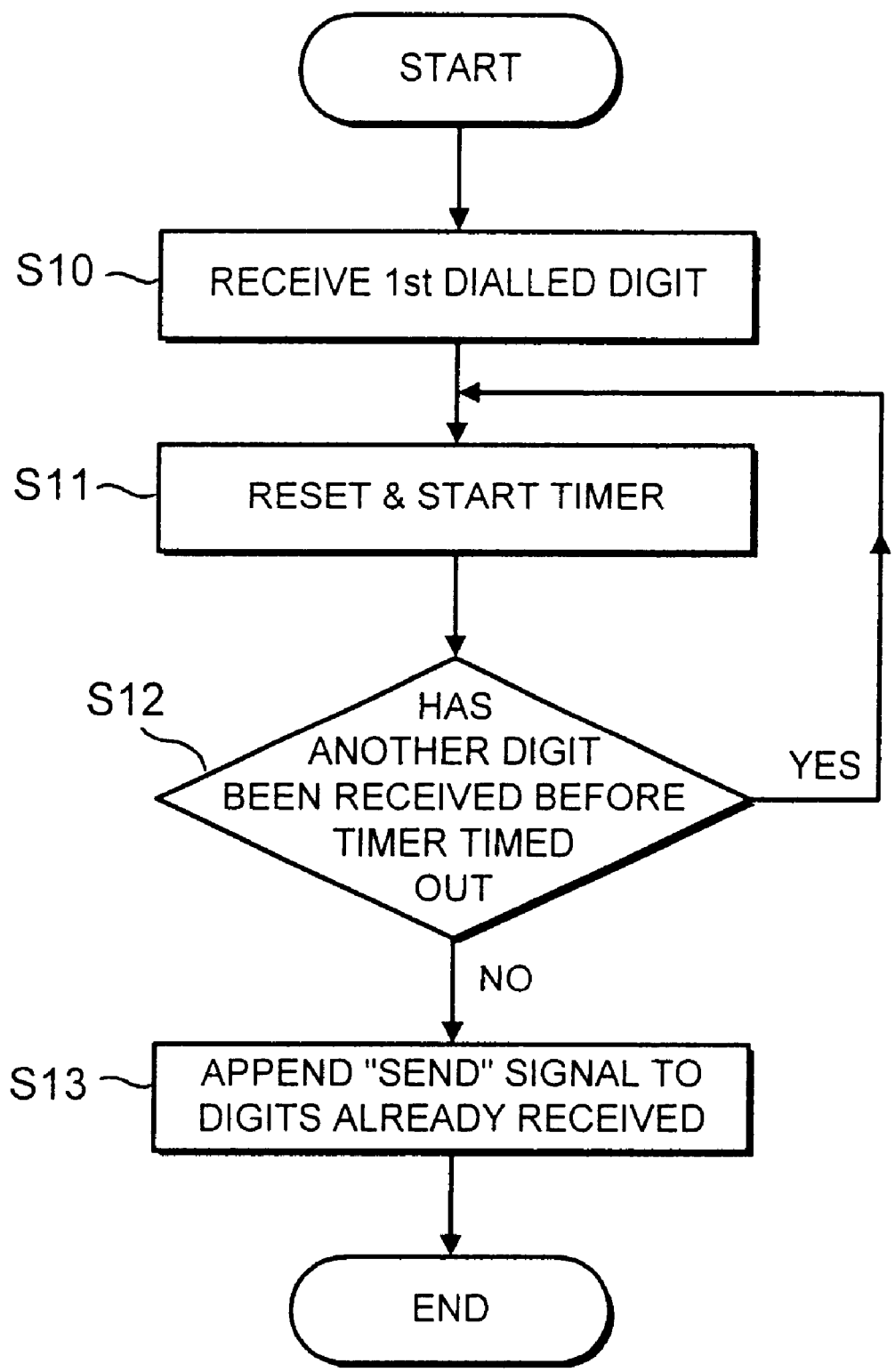
FIG. 2 shows another dialling procedure according to the prior art.
Figure 3:
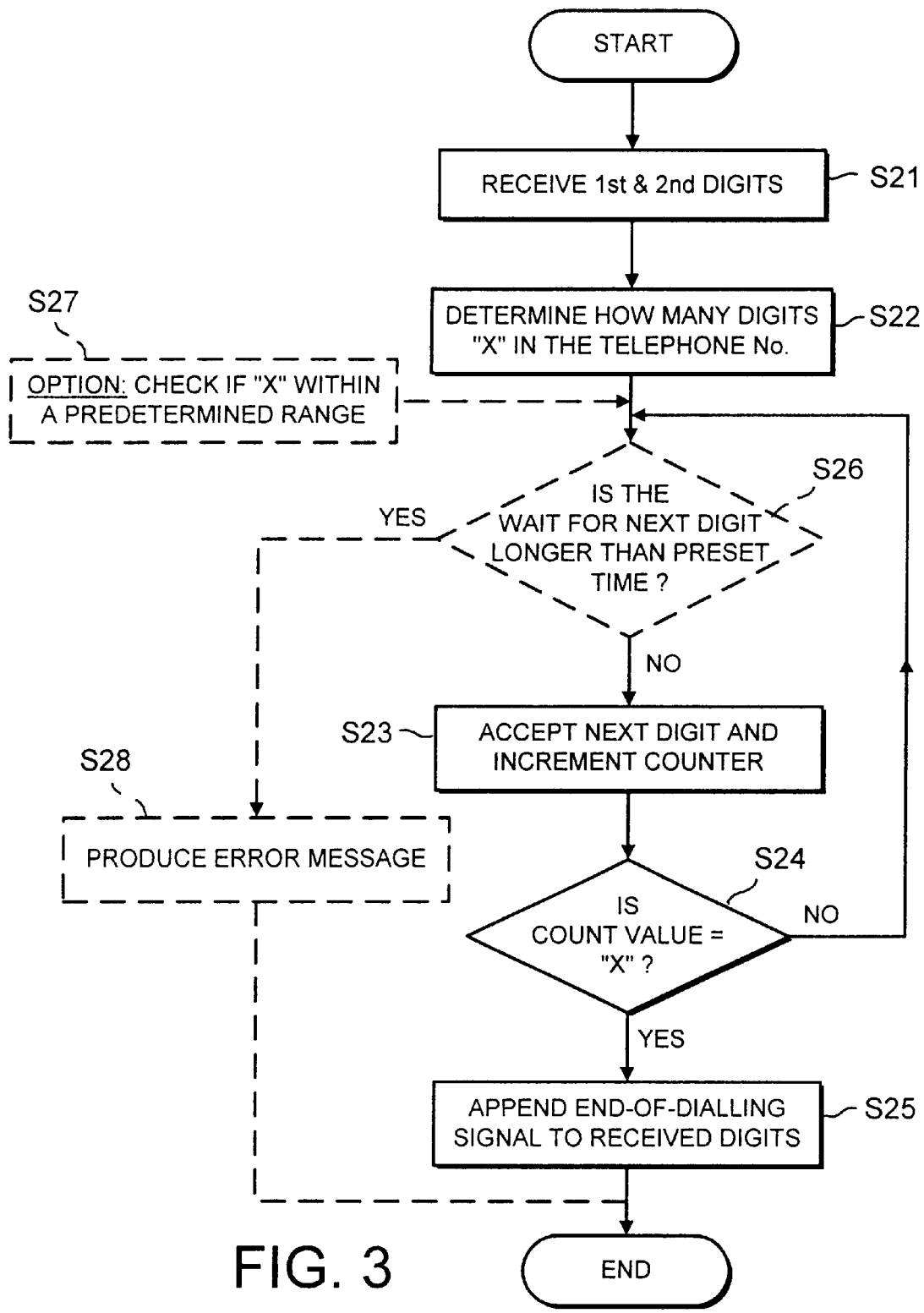
FIG. 3 shows a dialling procedure according to preferred embodiments of the present invention.

FIG. 3 shows the dialling procedure in a telephone apparatus according to a preferred embodiment of the present invention.

In step S21, the telephone receives the first and second digits which represent the amount of digits constituting the telephone number to be dialled. This amount is determined in step S22. For example, if the caller wishes to dial the telephone number "864579" the caller would dial the number "06864579". The first two digits "06" indicate that there are six digits in the telephone number to be dialled. Similarly, if the caller wishes to dial"+441256864579", the digits "13+441256864579" would be entered. The first two digits "13" indicate that there are thirteen digits (including the symbol "+") in the number to be dialled.

Once the telephone has determined in step S22 how many digits constitute the telephone number, a count value is incremented each time it receives a subsequent dialled digit, step S23. In step S24, if the count value is not equal to the expected number of digits constituting the telephone number, the telephone receives the next digit and increments the count value, step S23, and checks again whether the count value is equal to expected number. Once the telephone has received the expected number of dialled digits in step S24, it automatically appends the end of dialling signal to the received digits, step S25.

According to another feature (also shown in FIG. 3), the dialling apparatus has an additional step of checking that the first two digits are within a predetermined range, (as shown in dotted lines in step 27). The first digit will only have a range from 0–6 since the maximum size of a telephone number is 61 digits. Thus, the combination of the first and second digits is checked to verify that it is within a valid range, for example between 3 and 61.

According to yet another embodiment, (also shown in FIG. 3), the dialling apparatus has an additional feature of warning the caller if an incorrect number of digits have been dialled (also shown in dotted lines). As before in step S21, the telephone receives the first and second digits which represent the number of digits constituting the telephone number to be dialled. This number is determined in step S22.

The additional feature, shown in step S26, determines whether the dialling apparatus has been waiting for longer than a prescribed period for the next digit to be dialled. Assuming that the caller is dialling correctly, the next digit will be entered within the prescribed period, the count value updated as normal in step S23, and the count value checked in step S24 to determine whether it equals the expected number of digits constituting the telephone number. If the count value equals the expected number of digits constituting the telephone number in step S24, the end-of-dialling signal is appended to the received digits in step S25.

However, if the count value does not equal the expected number of digits in step S24, the dialling apparatus returns to step S26 to await the next dialled digit. In this respect, the operation of this embodiment is identical to that described in relation to the previous embodiment above. However, if the next digit is not entered within the prescribed period in step S26, the dialling apparatus provides the caller with a warning in step S28, for example an audible tone, indicating that an error has occurred. Such an error may occur if the caller has indicated that the telephone number comprises 13 digits, and then forgets to dial one of these digits. In such a situation, after the twelfth number has been dialled, the apparatus would return to step S26 to await the thirteenth digit to be dialled. Step S26 prevents the apparatus from waiting indefinitely in this idle state by providing the error message in step S28 when a predetermined time has lapsed.

The invention described above enables an end-of-dialling signal to be appended to a dialled telephone number in a manner which avoids the disadvantages associated with the prior art.

The invention has the additional advantage of having inherent checks, since the first two digits must be within a predetermined range, and/or correspond to the number of digits subsequently dialled.

The dialling apparatus may form part of a fixed access unit, or a separate interface between a fixed access unit and a conventional telephone.

Although the invention has been described in relation to dialling on a fixed line (or conventional wired) telephone, it could also be used as a means of eliminating the need to press a "send" key on a mobile telephone.

What is claimed is:

1. A telephone dialing apparatus comprising;

means for determining from first and second dialed digits how many digits constitute a telephone number to be subsequently dialed, wherein the first and second digits do not form part of the telephone number to be dialed;

means for determining when the digits constituting the telephone number have been dialed; and means for automatically appending an end-of-dialing signal to the end of the telephone number.

2. telephone dialing apparatus as claimed in claim 1, wherein the means for determining when dialing of the telephone number is complete comprises a counter for counting the number of dialed digits.

3. A telephone dialing apparatus as claimed in claim 1, wherein the dialing apparatus forms part of a fixed access unit, which receives dialed digits from a fixed line subscriber equipment.

4. A telephone dialing apparatus as claimed in claim 1, wherein the dialing apparatus forms an interface between a fixed line subscriber equipment and a fixed access unit.

5. A telephone dialing apparatus as claimed in claim 1, wherein the end-of-dialing signal represents a SEND signal.

6. A telephone dialing apparatus as claimed in claim 1, having means for providing an indication to a caller if the number of dialed digits does not correspond with the amount specified in the first two digits dialed.

7. A telephone dialing apparatus as claimed in claim 6, wherein the indication is given when the dialing apparatus is awaiting for a digit to be dialed for longer than a predetermined time.

8. A telephone dialing apparatus as claimed in claim 1, wherein the first and second digits are checked to determine whether they are within a predetermined range.

9. A telephone dialing apparatus as claimed in claim 8, wherein the predetermined range in from 3 to 61.

\* \* \* \* \*